US012331711B2

(12) United States Patent
Tauscher

(10) Patent No.: US 12,331,711 B2
(45) Date of Patent: Jun. 17, 2025

(54) SYSTEM FOR STORING AND RECOVERING ENERGY

(71) Applicant: Johann Tauscher, Vienna (AT)

(72) Inventor: Johann Tauscher, Vienna (AT)

( * ) Notice: Subject to any disclaimer, the term of this patent is extended or adjusted under 35 U.S.C. 154(b) by 43 days.

(21) Appl. No.: 17/924,391

(22) PCT Filed: Apr. 29, 2021

(86) PCT No.: PCT/EP2021/061295
§ 371 (c)(1),
(2) Date: Nov. 10, 2022

(87) PCT Pub. No.: WO2021/228569
PCT Pub. Date: Nov. 18, 2021

(65) Prior Publication Data
US 2023/0175472 A1 Jun. 8, 2023

(30) Foreign Application Priority Data
May 11, 2020 (DE) ..................... 10 2020 112 724.3

(51) Int. Cl.
 *F03B 17/00* (2006.01)
 *F03B 13/06* (2006.01)
 *H02J 15/00* (2006.01)
(52) U.S. Cl.
 CPC ............ *F03B 17/005* (2013.01); *F03B 13/06* (2013.01); *H02J 15/006* (2013.01);
 (Continued)
(58) Field of Classification Search
 CPC ....... F03B 17/005; F03B 13/06; H02J 15/006; F05B 2260/422; F05B 2210/11; F05B 2210/12; F05B 2210/18
 See application file for complete search history.

(56) References Cited

U.S. PATENT DOCUMENTS 7,579,700 B1 8/2009 Meller
2002/0144504 A1* 10/2002 Merswolke ............... F03D 9/10
60/398

(Continued)

FOREIGN PATENT DOCUMENTS

DE 102018111997 11/2019
WO WO 93/06367 4/1993

(Continued)

OTHER PUBLICATIONS

International Search Report and the Written Opinion Dated Jun. 8, 2021 From the International Searching Authority Re. Application No. PCT/EP2021/061295 and its Translation into English. (11 Pages).

*Primary Examiner* — Viet P Nguyen

(57) ABSTRACT

The invention relates to a system for storing and recovering energy, comprising at least two liquid containers for storing a liquid, the two liquid containers being preferably located at substantially the same level and/or preferably having a substantially identical volume, and a turbine unit for power generation, which connects the two liquid containers to one another and is designed in such a way that the liquid can flow from the one liquid container through the turbine and into the other liquid container and thereby drives the turbine, and a working gas provision unit for providing a working gas, in particular air, having a substantially constant working gas pressure, the working gas provision unit being connected to the two liquid containers and designed in such a way that the working gas having said constant working pressure conveys the liquid from the one liquid container, via the turbine unit and into the other liquid container.

6 Claims, 4 Drawing Sheets

(52) U.S. Cl.
CPC ....... *F05B 2210/11* (2013.01); *F05B 2210/12* (2013.01); *F05B 2210/18* (2013.01); *F05B 2260/422* (2020.08)

(56) References Cited

U.S. PATENT DOCUMENTS

| | | | |
|---|---|---|---|
| 2017/0264164 A1* | 9/2017 | Lenk | F03G 7/06 |
| 2018/0156184 A1* | 6/2018 | Alao | H02J 15/006 |
| 2019/0242357 A1* | 8/2019 | Mesinger | F03B 13/06 |
| 2020/0277896 A1* | 9/2020 | Romero | F03B 17/005 |

FOREIGN PATENT DOCUMENTS

| | | | |
|---|---|---|---|
| WO | WO-2013141826 A2 * | 9/2013 | ........... F01K 27/005 |
| WO | WO-2018069925 A1 * | 4/2018 | ............. F03B 13/06 |
| WO | WO 2019/061002 | 4/2019 | |
| WO | WO-2019061002 A1 * | 4/2019 | ............. F03B 13/00 |

\* cited by examiner

SYSTEM FOR STORING AND RECOVERING ENERGY

RELATED APPLICATIONS

This application is a National Phase of PCT Patent Application No. PCT/EP2021/061295 having International filing date of Apr. 29, 2021, which claims the benefit of priority of Germany Patent Application No. 10 2020 112 724.3 filed on May 11, 2020. The contents of the above applications are all incorporated by reference as if fully set forth herein in their entirety.

FIELD AND BACKGROUND OF THE INVENTION

The invention relates to a system for storing and recovering energy.

Discontinuous energy generation processes for feeding power grids, such as those found with wind energy, result in the energy provided temporarily exceeding the energy required. In contrast, there may be energy shortages at other times when there is no wind (and a high demand for energy). In order to compensate for these fluctuations, systems for storing and recovering energy are used, which store energy whenever there is a surplus of energy in the primary generation of energy (e.g. in the wind power park) and keep the stored energy available for times when the primary generation of energy cannot saturate the prevailing energy demand.

Such a system for storing and recovering energy is known, for example, from EP 3 321 501 B1. This system has a compressed air tank and a pressurised water tank that are permanently under pressure equilibrium. Before operation, the compressed air tank and thus also the pressurised water tank are brought to an operating pressure by means of a compressor, depending on the configuration. To feed energy into the system, water may be pumped from a water storage tank into the pressurised water tank via a high-pressure pump. The increasing amount of water in the pressurised water tank displaces the air in it into the compressed air tank, which is connected to the pressurised water tank. Due to the increase in volume of the water and the resulting compression of the air, there is an increase in pressure in the two connected containers. When energy is required, an energy supply cycle is run in which the pressurised water flows through an impulse turbine until the pressurised water tank is completely emptied, thereby driving the turbine. A generator connected to the turbine, which is driven by the turbine, feeds the electric power generated with its help into a power grid.

This system has proven to be disadvantageous for several reasons.

One of the reasons is that the water storage tank requires a lot of space and this open system is exposed to the environment, so that contamination (sedimentation) of the water in the water storage tank is inevitable over time and, in order to prevent contamination and possible resulting malfunctions, the system must be protected with cost-intensive structural measures. Sedimentation can cause damage to the turbine buckets, for example of a Pelton turbine.

Another reason is that a high-pressure water pump is necessary for ongoing operation, wherein the high-pressure water pump pumps the water up from the water storage tank into the pressurised water tank and has work against the air pressure increasing in the pressurised air tank. The electrical supply is provided by the public power grid. Therefore, in addition to the compressor, another expensive and wear-prone system high-pressure component is necessary, comprising at least the high-pressure water pump and the associated piping.

Another reason is that each energy supply cycle is limited by the volume of water in the pressurised water tank and before a new energy supply cycle can be performed, as mentioned earlier, the pressurised water tank must be reloaded with water by performing lifting work when pumping up the water and the air pressure building up in the compressed air tank at the same time. This recharging process is energy- and time-consuming, and thus only possible when there is a surplus of energy in the power grid. In addition, this system design prevents continuous operation.

Furthermore, the permanent pressure differences in the containers and pipes over the entire operating range, which extends between a pressurised water tank completely filled with water and a pressurised water tank completely emptied, and a compressed air tank filled with compressed air and filled with expanded air, result in an extremely dynamic load on the containers and pipes. These components must be designed accordingly, which leads to an expensive implementation. In the course of time, leaks are also unavoidable in the area of the connection points of the system components due to the recurring dynamic load fluctuations.

Furthermore, the continuous pressure drop is very disadvantageous, since it requires complex controls for voltage and frequency (Hertz). The continuous pressure drop also causes considerable problems when feeding into the public grid, as supply fluctuations are undesirable on the part of the grid operators.

Against this background, the invention has the objective of providing an improved system for storing and recovering energy so that the problems discussed are avoided.

SUMMARY OF THE INVENTION

This object is solved with a system for energy storage and recovery, the system comprising at least two liquid containers for storing a liquid, the two liquid containers preferably being positioned at essentially the same level and/or preferably also having a substantially identical volume, and a turbine unit for power generation, which connects the two liquid containers to each other and is designed in such a way that the liquid can flow from one liquid container through the turbine into the other liquid container, thereby driving the turbine, and a working gas supply unit for supplying a working gas, in particular air, with a substantially constant working gas pressure, wherein the working gas supply unit is connected to the two liquid containers and is designed in such a way that the working gas with said constant working gas pressure conveys the liquid from one liquid container through the turbine unit into the other liquid container.

The measures according to the invention have the further advantage that the system does not require any additional high-pressure liquid pumps, which considerably reduces the number of components to be installed as well as to be maintained, thus reducing the investment costs and also the operating costs, which ultimately leads to a more cost-efficient system in which the reliability due to the reduction of highly loaded system components is considerably higher than that of other systems having said high-pressure liquid pumps.

Liquid movement through the turbine unit is achieved solely by the working gas pressure, which is substantially constant during an energy supply cycle, acting from above on the liquid surface and moving the liquid from one liquid container through the turbine unit into the other liquid container.

Since the at least two liquid containers are positioned at substantially the same, preferably identical, level, there is also essentially no lifting work to be performed against gravity during liquid transport. If the liquid containers are not at an identical level, for example with a level difference of approx. 10 metres, because a hillside location makes this necessary, this can be taken into account by the absolute value of the constant pressure of the working gas during the respective energy supply cycle. Furthermore, the liquid transferred from one liquid container to the other is immediately available there again for the next energy supply cycle. According to a first configuration of the system, the liquid can be conveyed back into the first liquid container by means of the working gas, thereby flowing through the turbine unit and then being available again in the first liquid container for the next energy supply cycle, after which the cycle of conveying the liquid and returning it can start again.

In another configuration of the system, the liquid can be conveyed from the second liquid container to another, that is, third liquid container, while electric current is generated. From the third liquid container, the liquid can subsequently be transported back to the first liquid container with the aid of the working gas, while electric current is generated again, after which this cycle can start again.

Therefore, a further advantage is that the energy yield of the system is not limited by the volume of liquid stored in the liquid container, since the liquid is transported quasi-continuously in consecutive cycles by means of the working gas between the respective liquid containers, wherein electric current is always generated during the respective transport phase, that is, consecutive energy supply cycles may be combined to form a continuous energy supply.

In this quasi-continuous transport process, it is advantageous to note that the transport of the liquid takes place with constant liquid pressure, because the working gas pressure of the working gas is also kept constant during the energy supply cycle. This ensures that the turbine rotates at a constant frequency and that the electricity generated by the generator coupled to the turbine is generated at a substantially constant frequency and can thus be fed into the power grid as easily as possible.

The system presented here can be implemented in many places and in a wide range of dimensions thanks to its low environmental requirements. For example, the system can serve as an emergency energy storage system for remote cities or help companies with large photovoltaic systems (for example, on production halls) to use the generated energy appropriately, or traditionally, with the corresponding capacity, it can serve as an energy storage and energy supply system near a power plant or a wind park. Accordingly, the requirement for the liquid may differ not only in quantity but also in its properties.

It is advantageous if the liquid does not undergo a phase transformation in the vicinity of the operating range, that is, at the working gas pressure and temperatures that occur in the system. The density should at least be as constant as possible, so that the pressure in the liquid container does not change as a result of the change in density. The viscosity of the liquid should preferably be adjusted so that the losses in the system due to the movement of the liquid are as low as possible. It is therefore generally advantageous to use liquids that have a low viscosity in the operating range. In general, water meets this requirement and is a good choice in many applications, in particular for large installations. However, liquids with a lower viscosity can also be advantageous, in particular for smaller installations. For example, the non-flammable liquids trichloroethene and chloroform have a lower viscosity than water. If liquids with a different viscosity than that of water are used, an adjustment of the turbine may be advantageous.

Another aspect that may need to be considered in relation to the liquid is cavitation or evaporation pressure. If the static pressure, which, according to Bernoulli, decreases with increasing speed, falls below the evaporation pressure, gas bubbles form (cavitation). This may cause damage to the turbine. The liquid and the turbine unit must therefore be compatible with each other. The effect of cavitation is mainly to be considered in Kaplan turbines and Francis turbines. However, such turbines may of course also be used in this system, provided that their specific properties are taken into account. For example, a Kaplan turbine can be used at a working gas pressure of only 10 bar (equivalent to a water column of 100 metres).

Due to the fact that in this system the liquid remains permanently in a closed system area, not only the turbine unit can be designed with regard to the liquid, but also the liquid can be selected in such a way that the conditions are optimally adapted to each other. As with the use of refrigerants in refrigeration machines, this opens up a multitude of new possibilities when setting or defining the system properties. Thus, new liquids and combinations of liquids are also considered here, which are accessible to the skilled person due to the knowledge imparted here.

The dimensions of a liquid storage tank can be adapted to the electrical energy to be generated, for example, adapted for long energy supply cycles. For example, this system can also have one or a few million(s) cubic metres of liquid in the liquid storage tank. For these volumes, the cost of the liquid can be significantly relevant. However, the liquid storage tanks can also be optimised for shorter energy supply cycles and thus be correspondingly smaller.

Furthermore, it can be noted that in other, open systems, where the liquid is in contact with the environment, which always involves a consumption of liquid or a release into the environment, the selection of liquids is very limited. Liquids other than water are hardly conceivable in these open systems because, on the one hand, the cost of a liquid that is consumed would be enormous for liquids other than water and, on the other hand, many of these liquids would be harmful to the environment.

In the system according to the invention, however, liquids other than water with different advantageous properties may also be used.

If the volume of the liquid is relatively small, it may be advantageous to use other liquids in addition to water that have the above-mentioned properties but are also suitable, for example, because they do not evaporate or evaporate only slightly, or because they have better corrosive properties. In contrast, for relatively larger volumes of liquid, the use of water can be advantageous because this liquid is extremely cheap and readily available. However, because the liquid remains in the system as much as possible, since it is a closed circuit, it is also possible here to adapt the properties to the respective operating range at low cost by means of additives.

The liquid containers may be made of a wide variety of materials as long as they can withstand the water and working gas pressure plus the usual design measures and safety features and are compatible with the working gas and the liquid, that is, no corrosion is to be expected. For example, the containers may be made of steel or concrete. A structure made of several materials combined with each other or even composite materials is also possible. For example, the liquid container can consist of a mechanically stable structural layer, such as concrete or reinforced concrete, and have a liquid- and working gas-impermeable as well as chemically resistant protective layer of, for example, polymers and/or metal(s) or metallic alloys inside this layer. Such liquid containers, as well as optionally the other components of the system, can be arranged partially or completely underground.

It is also possible to use natural underground storage tanks as liquid containers. The working gas pressure can be set to suit the geological conditions.

It is not necessary for the different liquid containers to have exactly the same volume. It is only necessary to define a working liquid volume that can be transported from one liquid container through the turbine unit into the other liquid container. It is advantageous if the working liquid volume corresponds to the volume of the smallest liquid container so that the largest possible working liquid volume can be used per energy supply cycle.

Furthermore, it may be advantageous if the liquid containers that have a larger volume than the working liquid volume are filled with more liquid, i.e. with a residual liquid volume that corresponds to the difference between the volume of the container and the working liquid volume, so that the maximum working gas volume that corresponds to the working liquid volume is the same or similar for all liquid containers. This facilitates the control of the gas quantity filling of the individual liquid containers, as the quantity of gas to be injected per energy supply cycle is always the same.

It may also be advantageous if the liquid is guided before and/or after the turbine unit in such a way that it is guided from or into the rest of the liquid as smoothly as possible and with as little turbulence loss as possible.

This can be solved, for example, by the liquid containers having a riser. This may contribute to a more even flow of liquid from the liquid container into the turbine unit. When using the riser, the mouth of the riser may be located in the bottom area of the respective liquid container, or open into a structure or recess similar to a pump sump, so that the liquid located in the liquid container can be conveyed out of the liquid container almost completely by the pressure of the working gas acting on the liquid from above.

It may also be advantageous for the mouth of the riser to have a filter.

This measure can help to protect the turbine unit from solid bodies that may detach from the wall of such natural underground storage systems, particularly when natural underground storage systems are used. This problem does not usually arise in closed systems with artificial liquid containers.

The turbine unit connects at least two liquid containers with each other with the aim of converting the kinetic energy of the liquid into electrical energy. The fact that the turbine unit connects two liquid containers means here that the turbine unit allows the liquid in one of the two liquid containers to pass through the turbine unit into the other liquid container at a desired time. To achieve the goal of energy conversion, the turbine unit has at least one turbine and at least one generator.

In order to cause as little flow loss as possible, it may be advantageous to use a separate turbine for each liquid transport from one liquid container to another.

In a case where only two liquid containers are provided, this means that one turbine is provided between the two liquid containers for each flow direction. This can bring economic advantages, particularly for large systems that are operated for a long time, because the flow losses are reduced due to a simpler, for example also shorter, pipe routing.

However, the system may also be built with only one turbine or any number of turbines in the turbine unit. For this purpose, the turbine unit can have, in addition to the at least one turbine and the at least one generator, a liquid conduction system which conducts the liquid from a liquid container which is currently being filled with working gas (i.e. whose liquid is being pressed out) through the at least one turbine into the other liquid container which is being filled with the liquid. The liquid conduction system must change the direction of flow of the liquid in the next energy supply cycle.

In a version with two liquid containers, for example, the liquid is conveyed in such a way that it is now fed from the newly filled liquid container through the at least one turbine back into the previously filled and now empty liquid container.

For example, valves may be used for a configuration comprising a liquid conduction system to direct the liquid from different liquid containers to at least one same turbine. These valves can be self-regulating valves. These valves may open, for example, due to the pressure difference when the pressure in the liquid-filled liquid container on the liquid side corresponds to the working gas pressure and the pressure in the liquid container to be filled corresponds to the ambient pressure. The liquid can then flow from one liquid container through the at least one turbine into the corresponding other liquid container for an energy supply cycle. Due to the changed working gas supply by the working gas supply unit in the next energy supply cycle, the corresponding other valves open in this energy supply cycle so that the liquid can be passed through the turbine unit again, now coming from the other liquid container.

The components of the system in this embodiment are particularly cost-effective. However, the valves are preferably controllable valves. These have the advantage that they do not necessarily require energy from the system to open or close and that the switching (i.e. the switching on and off of the valves or in other words the opening and closing of the valves) can be optimised. This allows the run-up and run-down time as well as the switching time to be minimised.

The turbine unit may have a turbine control unit that is responsible for switching the valves. The turbine control unit may also be designed, for example, to communicate with a working gas supply unit control unit that regulates the working gas supply unit, and the two control units can adapt their decisions to each other. It is also possible that a central control unit coordinates the turbine control unit and the working gas supply unit control unit or that it takes over (among other things) the tasks of both. A control unit may therefore be provided, which may also consist of two or three sub-units.

The turbine unit may also have several turbines of the same size connected in parallel, which can be used selectively to increase the power of the system in combined operation. The turbine unit may also have several turbines of different sizes connected in parallel, which can be used selectively to improve or optimise the efficiency and/or the performance and/or the capacity of the system. These can then be controlled, for example, as required.

The inlet piping and the outlet piping must be dimensioned accordingly.

In this system, for example, impulse turbines, especially Pelton turbines, may be used. These convince with their high efficiency. Furthermore, it should be mentioned at this point that, depending on the configuration of the system, different types of turbines may be used, such as those already mentioned.

It is possible to use one or more generators, to operate the turbines and generators on one or more shafts and to connect them with gearboxes and couplings. Normally, however, only one turbine is operated with one generator on one shaft, either horizontally or vertically.

The working gas supply unit stores energy in case of an energy surplus, preferably primarily in the form of pressurised working gas in a pressure accumulator.

When energy is required, the working gas supply unit provides working gas at a substantially constant pressure. This working gas can then be used by the other system components for energy conversion, as described. For this purpose, the working gas supply unit is connected to the liquid containers. This means that at a desired time, the working gas supply unit can supply working gas at a substantially constant working gas pressure to a liquid container initially filled with liquid selected for that time, where the working gas applies a constant pressure to the liquid during the energy supply cycle. The supply of the working gas at the desired working gas pressure may be controlled by the working gas supply unit control unit or by the central control unit, which also performs other tasks.

Pressure regulation is provided to generate the substantially constant working gas pressure of the working gas. The pressure can be regulated by one or more pressure regulators. Simple self-regulating pressure reducers can take over this task. However, these are preferably controllable pressure regulation systems. Such a pressure regulation system may, for example, have one or more continuously controllable valves. Such a pressure regulation system may also have several throttles, in particular with different but invariable cross sections, which can be specifically controlled by preceding valves. A combination of continuously controllable valves and different throttles with constant cross section in different serial and/or parallel arrangements is also possible. A pressure regulation system may also have different sensors that measure, for example, pressure, flow or temperature. Such a pressure regulation system may, for example, also have various actuators that control the valve or valves. A control unit may be used to control or regulate the substantially constant working gas pressure set by the pressure regulator. This control unit may, for example, be a pressure regulation control unit with the primary task of controlling or regulating the pressure. However, the task may also be performed by a working gas supply unit control unit or by a central control unit. The pressure regulation system may also have other components, such as safety valves, preheaters, heat exchangers, dehumidifiers, etc. Known systems for providing a constant pressure may also be integrated, such as gas pressure regulating systems (GPR) or gas pressure control and measuring systems (GPCM), which are known for natural gas production.

The working gas may be a gas or a gas mixture. The working gas or, in the case of a gas mixture, its components, should, as far as possible, have no unwanted phase transformation in the vicinity of the operating range, as should the liquid. It should be noted that the operating range of the gas is larger than that of the liquid because the working gas can also be used for energy storage. Therefore, a distinction can be made between a working operating range, which roughly corresponds to the working range of the liquid in terms of pressure and temperature, and a storage operating range. If the gas is stored at a higher pressure than the working gas pressure, it could also be advantageous if the working gas changes to a phase with a higher density in this storage operating range, in order to be able to store more energy in the same space (or the same energy in a smaller space). Furthermore, the working gas should be as compatible as possible with the rest of the components of the system, for example to avoid corrosion of the metallic components or embrittlement of the seals. Because it is preferable in this system for a large proportion of the working gas to remain in the system, it may therefore make sense to select gases or gas mixtures with these properties. Generally, however, air performs these tasks quite well. Therefore, air may be a good solution for many applications. It may also be advantageous to change the proportions of the air or to remove or add components in such a way that the properties are improved. A classic example would be to dehumidify the air, for example to improve the corrosive properties but also to reduce the risk of icing when the compressed air is expanded. However, if the system is designed to circulate the working gas in the system for as long as possible, it may also be economically advantageous to add gas components that have a positive effect on the maintenance-free operating time of the system.

A higher proportion of noble gases, for example, could result in a less aggressive gas mixture and prevent corrosion.

Furthermore, the system may include measures to prevent evaporation of the liquid and thus reduce the likelihood of the working gas absorbing moisture (over time). In order to keep the working gas essentially dry, gas dehumidifiers may also be provided, for example.

Further, particularly advantageous configurations and further developments of the invention result from the dependent claims and the following description.

Furthermore, it has proven to be particularly advantageous that the system does not require the provision of open liquid containers, such as a liquid tank that is open at the top. The at least two liquid containers are, with regard to the liquid contained, preferably closed containers between which the liquid can flow through the turbine unit. Only evaporation losses of the liquid may be compensated for by supplying liquid from outside the liquid containers. This is accompanied by the advantage that the liquid contained in the liquid containers remains substantially clean over the operating time of the system and virtually no measures for cleaning and/or filtration need to be provided. The closed design also allows the liquid containers to be positioned underground, i.e. sunk into the landscape, or even submerged in a lake or the sea. This allows the energy storage of surplus electrical energy by means of the working gas supply unit de facto directly at the point of generation or in the immediate vicinity, such as in the vicinity of wind turbines or tidal power plants, so that the energy stored is available in a decentralised manner. This eliminates the need for space-consuming, long and therefore expensive piping for transporting liquid to remote liquid storage tanks, as is the case with all other storage power plants, for example, where liquid has to be lifted against gravity. The liquid storage tanks can advantageously be integrated into the local infrastructure of the power plant on site, for example by installing them underground and connecting them to each other by means of short pipes.

According to a further aspect, it may be advantageous that the working gas supply unit is configured to recirculate and recycle the working gas contained in one of the liquid containers.

By recirculating the working gas at a higher pressure than the ambient pressure, it needs to be compressed less for storage in a pressure accumulator that is under a certain storage gas pressure, which is higher than the working gas pressure, than a gas that is compressed from ambient pressure to the stored gas pressure. This saves energy during compression.

Moreover, by recirculating the working gas, most of the gas always remains in the system. Here, unlike other systems in which a vent valve of a liquid container containing a gas pressure higher than the ambient pressure is used to equalise the pressure, a large part of the working gas is recirculated here and not released into the environment. Additives that influence the properties of the gas can thus be used in a more cost-effective way. Furthermore, devices such as a (stronger) filter that filters the gas (or ambient air) received by the working gas supply unit during energy storage may be useful.

However, in conventional systems, filters are known to reduce the efficiency of the compressors. By intentionally omitting filters, possible damage is therefore often taken into account. However, because in the system according to the invention a large part of the working gas supplied to the working gas supply unit for compression comes from the system itself or, in other words, circulates in the system and therefore does not need to be filtered, it may be useful to filter the part that is newly introduced into the system, i.e., if air is used, only the ambient air supplied. This results in a system that has a good overall efficiency and is more reliable than conventional systems. The necessary structural measures substantially consist in providing a working gas recirculation system that connects the liquid containers to the working gas supply unit. This measure enables the working gas that is in the relevant (substantially emptied) liquid container at the end of an energy provision cycle to be recirculated and used from the relevant liquid container to the working gas supply unit. Here, the pressure of the working gas is successively reduced from the initial working gas pressure to a final pressure that corresponds minimally to the ambient pressure.

According to a further aspect, the working gas supply unit has a compressor and a pressure accumulator connected thereto on the outlet side, wherein the compressor is provided for compressing gas, in particular ambient air, for the purpose of storing the compressed gas with a stored gas pressure in the pressure accumulator.

The pressure accumulator may be made of a wide variety of materials or material combinations equivalent to the liquid containers, as long as it meets the requirements while providing sufficient safety. The pressure accumulator must be able to withstand the stored gas pressure with a sufficient margin. Also in this case, natural underground storage tanks are possible, for example. However, also steel storage tanks, concrete storage tanks, reinforced concrete storage tanks or similar can be installed above ground or underground, for example. Combinations of the aforementioned storage tanks with, for example, polymers as a wall coating or integrated into the wall material to improve the properties, such as reducing the diffusion of the working gas, are also possible. Material composites and/or composite materials may also be used. In its simplest form, the compressor may be of single-stage design and only be designed to compress a gas, for example ambient air, away from the outlet pressure, for example ambient pressure in the case of air, to the storage gas pressure. Preferably, however, it may be of multi-stage design, as this allows higher pressures to be achieved in a more efficient manner.

Heat is naturally generated when gases are compressed. This heat may be used in various ways to increase the efficiency of the system. For example, this can be fed to a heat accumulator, in particular a solid storage device. The stored heat may then be used at a later time, for example, when working gas from the pressure accumulator is used to provide energy and is expanded for this purpose. During expansion, the working gas cools down. Therefore, the heat may be used here, for example, to compensate for that. Another possibility for optimisation would be, for example, to alternatively or additionally use the heat to evaporate a liquid. The evaporated liquid may then be fed to a steam turbine, for example, which provides kinetic energy that may be used to increase the efficiency of the system. The advantage of this solution over heat accumulators is, in particular, that the kinetic energy can be used immediately or efficiently converted into forms of energy that can be stored effectively and for a long time (e.g. electrical energy). The heat accumulators, on the other hand, would only be at a usable temperature level for a certain time.

Instead of a compressor and the pressure accumulator, a steam generator may also be used, which provides steam instead of air as the working gas. The waste heat from the compressor could also be used to heat or temper the liquid in the liquid containers, e.g. to prevent icing in the winter months. In the case of water, for example, the temperature of the liquid could be set to approx. 4° C., as water has the highest density at this temperature and therefore a higher or optimum efficiency can be achieved in the turbine unit.

However, the compressor is preferably designed as a multi-stage compressor and is configured in such a way that, for compression, either the ambient air, using all compressor stages, or the working gas recirculated from the liquid container, using those compressor stage(s) which is/are optimised for compression of a gas at a pressure above the ambient pressure, is used.

The multi-stage compressor may consist, for example, of several compressor stages on one shaft or separate shafts, or also of several compressor packages designed to compress a gas at different pressures as well as different pressure differences. It may also be a combination of the two variants. For example, the multi-stage compressor may consist of several compressor packages, each having a shaft on which several compressor stages are mounted.

It is also possible, for example, that the shafts are coupled by switchable couplings. Also, different shafts may be permanently or switchably connected by means of gears, and these possibly with couplings.

The multi-stage compressor may, for example, be designed in such a way that the working gas recirculated to it from the liquid container is always directed to the compressor stage that is best designed for the respective pressure that the working gas has. This may be achieved, for example, by a working gas recirculation system with accordingly self-regulating or preferably controllable valves. The valves may be controlled or regulated via a dedicated compressor control unit or via the working gas supply unit control unit or via a central control unit.

Also, if the compressor is equipped with couplings, it may, for example, disengage those compressor stages that are designed for lower pressures than those currently required. This coupling may also be controlled or regulated, for example, by one of the control units mentioned. In addition to the valves, the working gas recirculation system may, for example, have pipes and/or bores for conveying the working gas.

The compressor may, for example, be driven by a motor, preferably an electric motor. If the system is directly connected to a power plant in order to store excess energy from the power plant, the compressor may also be mechanically connected, directly or indirectly, e.g. via gears, to components such as turbines of the power plant. The system may also be designed in such a way that it is possible to switch between these two types of drive, for example by means of couplings. The motor and the optional coupling may be controlled by one of the control units, for example.

According to a further aspect of the invention, each liquid container comprises a vent valve which, when the liquid container is filled with liquid, serves to vent the liquid container in its open state and which, in its closed state, prevents the working gas introduced by the working gas supply unit from leaking.

For the purpose of venting, the vent valve may be dimensioned or designed, or configured in a controllable manner in such a way that a desired or defined counterpressure builds up inside the liquid container to be vented. Preferably, however, the vent valve is dimensioned or designed, or configured in a controllable manner in such a way that during filling of the liquid container, a substantially constant pressure prevails in the liquid container, which approximately corresponds to the ambient pressure. Therefore, the vent valve ensures that the gas can escape sufficiently quickly without a significant build-up of counterpressure.

In the closed state of the vent valve, the gas introduced with the help of the working gas supply unit cannot escape and therefore pushes with constant working gas pressure from above onto the surface of the liquid in the liquid container.

Now, in operation, if the vent valve of the first liquid container, in which the working gas is to push on the liquid with its working gas pressure, is closed and the vent valve of the second liquid container, into which the liquid is to be transferred from the first liquid container, is open, there is a substantially constant pressure difference between the liquid containers, which is maintained by means of the working gas supply unit, while the liquid flows from the first liquid container through the turbine unit into the second liquid container.

This results in a constant flow, that is, a constant mass flow of the liquid through the turbine unit and thereby a constant power output, in particular with a constant rotational speed of the turbine and consequently also a constant frequency of the electric current generated with it. This makes it easier to feed energy into the power grid and causes fewer losses than if the power and frequency had to be regulated to the target on a large scale by means of mechanical, hydrodynamic (here the constant speed in the case of turbines is regulated via the nozzles, in particular the nozzle needles (position) (quantity/pressure)) or electronic measures. Of course, such methods, especially the nozzle needles (position), may also be used here to optimise the operation of the turbine unit and the power feed. By directly influencing the nozzle needles (e.g. their positions), the rotational speed of the turbine can be adjusted very precisely, and in particular also relatively quickly, and kept constant. However, these measures may be optimised for constant operation and do not need to be dynamically adjusted over a wide operating range during the course of an energy supply cycle.

Particularly preferably, however, the system has more than two liquid containers, wherein the system is configured in such a way that the liquid can be conveyed sequentially through all liquid containers from one liquid container to the next liquid container only between two liquid containers at a time.

By always having two liquid containers involved in the energy supply, the working gas can be returned to the working gas supply unit from a third liquid container, which is under residual pressure after the energy supply cycle in which it was involved, at rest and with efficiency in mind. An interruption, as is the case with other systems, is not required. This means that electricity can be continuously generated, with the exception of the short run-up and run-down phases, which are relatively short.

If, for example, a liquid container with a volume of one million cubic metres is under a residual pressure of 100 bar, the (valuable) energy stored in the form of the compressed working gas may be used by feeding it back into the compressor to save about 50% of energy when compressing the working gas to about 150 bar.

In order to overcome these phases, in addition to the aforementioned set of three fluid containers, another set of three fluid containers may operate in a phase-shifted manner, so that one set is always in the continuous energy supply phase, while the other set is in the short run-up and/or run-down phase.

A system of two sets with two liquid containers each is also possible if the continuous energy supply phase and the run-up and run-down phases are accordingly designed in a smart way.

Furthermore, the sets may also consist of several liquid containers connected consecutively, or several sets may run side by side in different phases.

All these configurations have the advantage that the water, which is carried by the pressure of the working gas, acts directly on the turbine. This results in a significantly improved efficiency compared to systems in which the working gas acts directly on a turbine.

Finally, for the sake of completeness, it should be noted that all containers as well as pipes, i.e. both the liquid-carrying and the gas-carrying components of the system, including their connections and valves etc., must be dimensioned with sufficient safety for the pressure prevailing or the maximum pressure to be expected in the system or in the respective subsystem. This ensures that the system is not only pressure resistant within its operating range but also has sufficient reserve.

These and other aspects of the invention will become apparent from the figures described below.

BRIEF DESCRIPTION OF THE SEVERAL VIEWS OF THE DRAWINGS

The invention will be explained in more detail below with reference to the attached figures on the basis of exemplary embodiments, to which, however, the invention is not limited. In the different figures, the same components are given identical reference signs. The figures schematically show the following.

DESCRIPTION OF SPECIFIC EMBODIMENTS OF THE INVENTION

Figure 1:
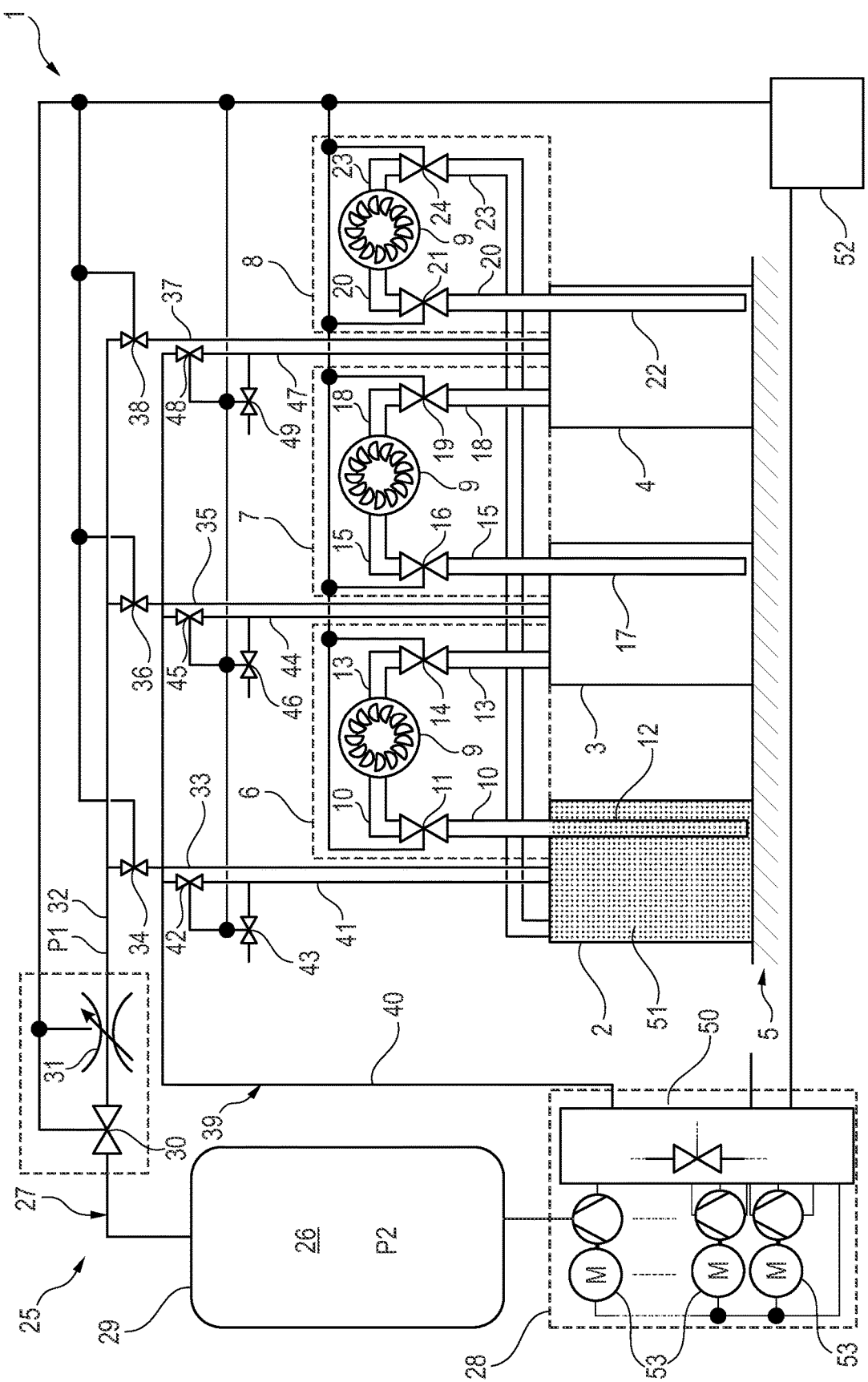
FIG. 1 shows a system for storing and recovering energy with three liquid containers.

FIG. 1 shows a system 1 for storing and recovering energy, hereinafter referred to as system 1 for short.

The system 1 has a first, second and third liquid container 2, 3, and 4, wherein each liquid container 2-4 has a capacity of, for example, approximately 1 million cubic metres of water and all liquid containers 2-4 stand on a flat bottom plate 5 so that they are at the same level. The liquid containers 2-4 are made of concrete/reinforced concrete and are built in such a way that they can withstand the pressures prevailing in the system 1 with sufficient safety, which also applies to all other components of the system 1.

The system 1 further comprises a first, second and third turbine unit 6, 7 and 8, the turbine units being equipped with Pelton turbines 9 for power generation, which are installed above the liquid containers 2-4 as shown in FIG. 1. The Pelton turbines 9 are each connected to a generator (not shown) so that this unit comprising turbine and generator can convert kinetic energy into electrical energy.

The first turbine unit 6 connects the first liquid container 2 to the second liquid container 3 in such a way that the liquid can flow from the first liquid container 2 through the Pelton turbine 9 into the second liquid container 3, thereby driving the Pelton turbine 9. Specifically, the first turbine unit 6 has, on the inlet side, a first turbine inlet piping 10 with a first turbine inlet valve 11 and with a first riser 12, which extends close to the bottom of the first liquid container 2 or its pump sump-like recess, where it allows liquid to exit from the first liquid container 2. On the outlet side, the first turbine unit 6 has a first outlet piping 13 with a first outlet valve 14, wherein the first outlet piping 13 is coupled at the top to the second liquid container 3, where it allows liquid to enter the latter.

(When the second cycle begins, i.e. the liquid from the second liquid container is fed via the turbine to the liquid container 3, the first liquid container, which is indeed under e.g. 100 bar compressed air, must be returned to the pressure accumulator via the compressor station. This saves approx. 50% energy, as the compressor station is supplied with compressed air at an average of 50 bar, raised to the setpoint, e.g. 150 bar, and stored in the pressure accumulator for reuse).

The second turbine unit 7 connects the second liquid container 3 to the third liquid container 4 in such a way that the liquid can flow from the second liquid container 3 through the Pelton turbine 9 into the third liquid container 4, thereby driving the Pelton turbine 9. Specifically, the second turbine unit 7 has, on the inlet side, a second turbine inlet piping 15 with a second turbine inlet valve 16 and with a second riser 17, which extends close to the bottom of the second liquid container 3 or its pump sump-like recess, where it allows liquid to exit from the second liquid container 3. On the outlet side, the second turbine unit 7 has a second outlet piping 18 with a second outlet valve 19, wherein the second outlet piping 18 is coupled at the top to the third liquid container 4, where it allows liquid to enter the latter.

The third turbine unit 8 connects the third liquid container 4 to the first liquid container 2 in such a way that the liquid can flow from the third liquid container 4 through the Pelton turbine 9 into the first liquid container 2, thereby driving the Pelton turbine 9. Specifically, the third turbine unit 8 has, on the inlet side, a third turbine inlet piping 20 with a third turbine inlet valve 21 and with a third riser 22, which extends close to the bottom of the third liquid container 4 or its pump sump-like recess, where it allows liquid to exit from the third liquid container 4. On the outlet side, the third turbine unit 8 has a third outlet piping 23 with a first outlet valve 24, wherein the third outlet piping 24 is coupled at the top to the first liquid container 2, where it allows liquid to enter the latter. The system 1 further comprises a working gas supply unit 25 for providing a working gas 26 as air, having a substantially constant working gas pressure P1, the working gas supply unit 25 comprising a working gas supply system 27 which enables the working gas 26 with constant working gas pressure P1 to be supplied to the liquid containers 2-4.

For the purpose of providing the working gas 26 with the constant working gas pressure P1, the working gas supply system 27 has a multi-stage (here, for example, a three-stage) compressor 28 which is used to compress air, which is supplied to it primarily as ambient air on the inlet side,
to a storage pressure P2 which is higher than the working pressure P1. For this purpose, the compressor 28 has several motors 53 that may be operated with electrical energy from the power grid.

On the outlet side, the compressor 28 is connected to a pressure accumulator 29, in which the working gas 26 is stored at the storage pressure P2.

A non-return valve, which is not shown in the figures, is advantageously provided between the compressor 28 and the pressure accumulator 29.

The working gas supply system 27 is connected to the pressure accumulator 29, which has a shut-off valve 30 on the inlet side that is initially closed, e.g. when starting up the system 1, until the storage pressure P2 has built up. Furthermore, the working gas supply system 27 has a pressure regulator 31, by means of which the storage pressure P2 is lowered to the working gas pressure P1.

The working gas supply system 27 has a central supply line 32 that couples to the pressure regulator 31 on the inlet side.

A first supply line 33 branches off from the central supply line 32 and has a first supply valve 34, the first supply line 33 flowing into the first liquid container 2 on the top side, so that the working gas 26 can be supplied there when the first supply valve 34 is open. A second supply line 35 branches off from the central supply line 32 and has a second supply valve 36, the second supply line 35 flowing into the second liquid container 3 on the top side, so that the working gas 26 can be supplied there when the second supply valve 36 is open.

A third supply line 37 branches off from the central supply line 32 and has a third supply valve 38, the third supply line 37 flowing into the third liquid container 4 on the top side, so that the working gas 26 can be supplied there when the third supply valve 38 is open.

The working gas supply unit 25 further comprises a working gas recirculation system 39 which allows the working gas 26 located in the liquid containers 2-4 and under pressure to be returned to the compressor 28 and to be used there, that is, to use the pressure of the working gas 26 so that it is not necessary to compress the ambient air away from the pressure of the ambient air each time the pressure accumulator 29 is refilled.

The working gas recirculation system 39 has a central recirculation line 40 that flows into the compressor 28 on the outlet side.

A first recirculation line 41 branches off from the central recirculation line 40 and has a first recirculation valve 42, the first recirculation line 41 flowing into the first liquid container 2 on the top side, so that the working gas 26 can be returned from there to the compressor 28 when the first recirculation valve 42 is open. Between the first recirculation valve 42 and the mouth of the first recirculation line 41 in the first liquid container 2, the first recirculation line 41 is coupled to a first vent valve 43 open to the environment, which allows venting of the first liquid container 2 to the environment when the first vent valve 43 is open.

A second recirculation line 44 branches off from the central recirculation line 40 and has a second recirculation valve 45, the second recirculation line 44 flowing into the second liquid container 3 on the top side, so that the working gas 26 can be returned from there to the compressor 28 when the second recirculation valve 45 is open. Between the second recirculation valve 45 and the mouth of the second recirculation line 44 in the second liquid container 2, the second recirculation line 44 is coupled to a second vent valve 46 open to the environment, which allows venting of the second liquid container 3 to the environment when the second vent valve 46 is open.

A third recirculation line 47 branches off from the central recirculation line 40 and has a third recirculation valve 48, the third recirculation line 47 flowing into the third liquid container 4 on the top side, so that the working gas 26 can be returned from there to the compressor 28 when the third recirculation valve 48 is open. Between the third recirculation valve 48 and the mouth of the third recirculation line 47 in the second liquid container 2, the third recirculation line 48 is coupled to a third vent valve 49 open to the environment, which allows venting of the third liquid container 4 to the environment when the third vent valve 49 is open.

The compressor 28 has a supply air selection unit 50 on the inlet side, to which on the one hand the pre-compressed working gas 26 can be supplied by means of the central recirculation line 40 and to which on the other hand the ambient air can also be supplied. The supply air selection unit 50 may be used to select whether the pre-compressed working gas 26 is to be used for compression or whether the ambient air is to be compressed. In particular, when using the pre-compressed working gas 26, the supply air selection unit 50 may be used to determine which stage(s) of the compressor 28 should be used for optimised compression.

With regard to the liquid containers 2-4, it should be noted that these are hermetically sealed, of course with the exception of the connections to the pipes carrying working gas 26 or liquid.

Furthermore, the system 1 has a control unit 52 which is designed to control or regulate all the valves 30, 34, 36, 38, 42, 45, 48, 43, 46, 49, 11, 14, 16, 19, 21, 24, or their actuators, which open or close the corresponding valves, the supply air selection unit 50 or its actuators, as well as the pressure regulator 31 or its actuator, and the motors 53 of the compressor 28. The control unit 52 may be, for example, a central server with appropriate programming, which sends its control signals to the various electronically controllable system components (such as the aforementioned valves, etc.). Several sub-control units (not shown) may also be provided, which are positioned, e.g., in a decentralised manner on the respective system components to be controlled, and which are controlled in a coordinating manner by a superordinate control unit. In case of an energy surplus, the compressor 28 or its motors 53 may be controlled to compress ambient air or working gas 26 from one of the liquid containers 2, 3, 4 to the storage pressure P2 and to feed it into the pressure accumulator 29. This means that the excess energy of the power grid is used to fill the pressure accumulator 29 with working gas 26 or air. Particularly in the case of compression of ambient air, further steps such as filtration and dehumidification of the air can be carried out upstream. The phases between energy surplus and energy demand are fluctuating and can have different time intervals. Thus, the energy demand is usually higher during the day than at night. But longer periods of time are also possible. For example, wind parks may have a seasonal energy surplus over a longer period of time, followed by weeks or months in which the energy demand cannot be met by the wind parks alone (without energy storage). In the pressure accumulator 29, unlike many other energy storage methods such as heat accumulators or kinetic energy accumulators, the working gas 26 may also be stored for long periods of time.

Figure 2:
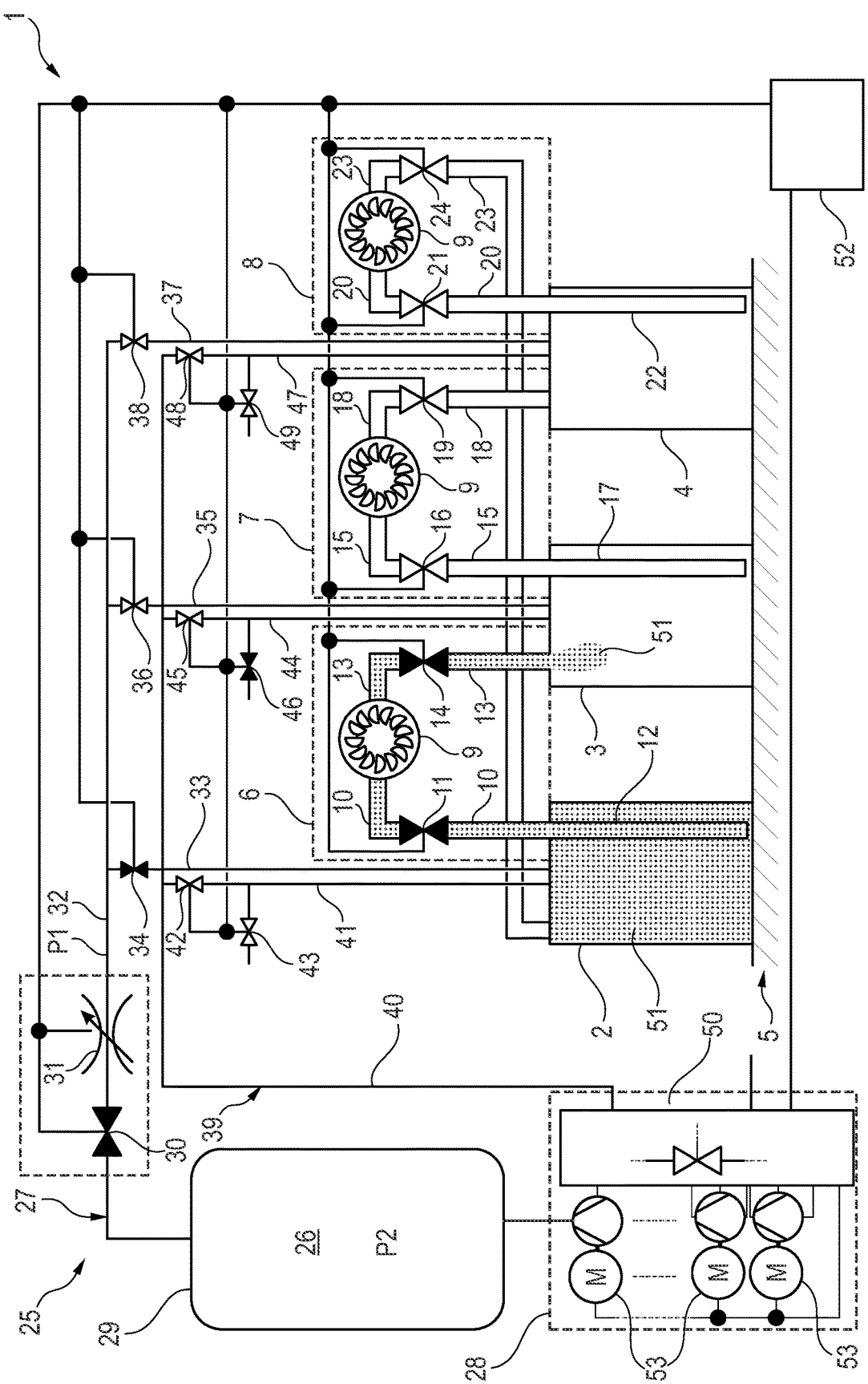
FIGS. 2, 3 and 4 show the system according to FIG. 1 in a snapshot at the beginning of an energy supply cycle.
Figure 3:
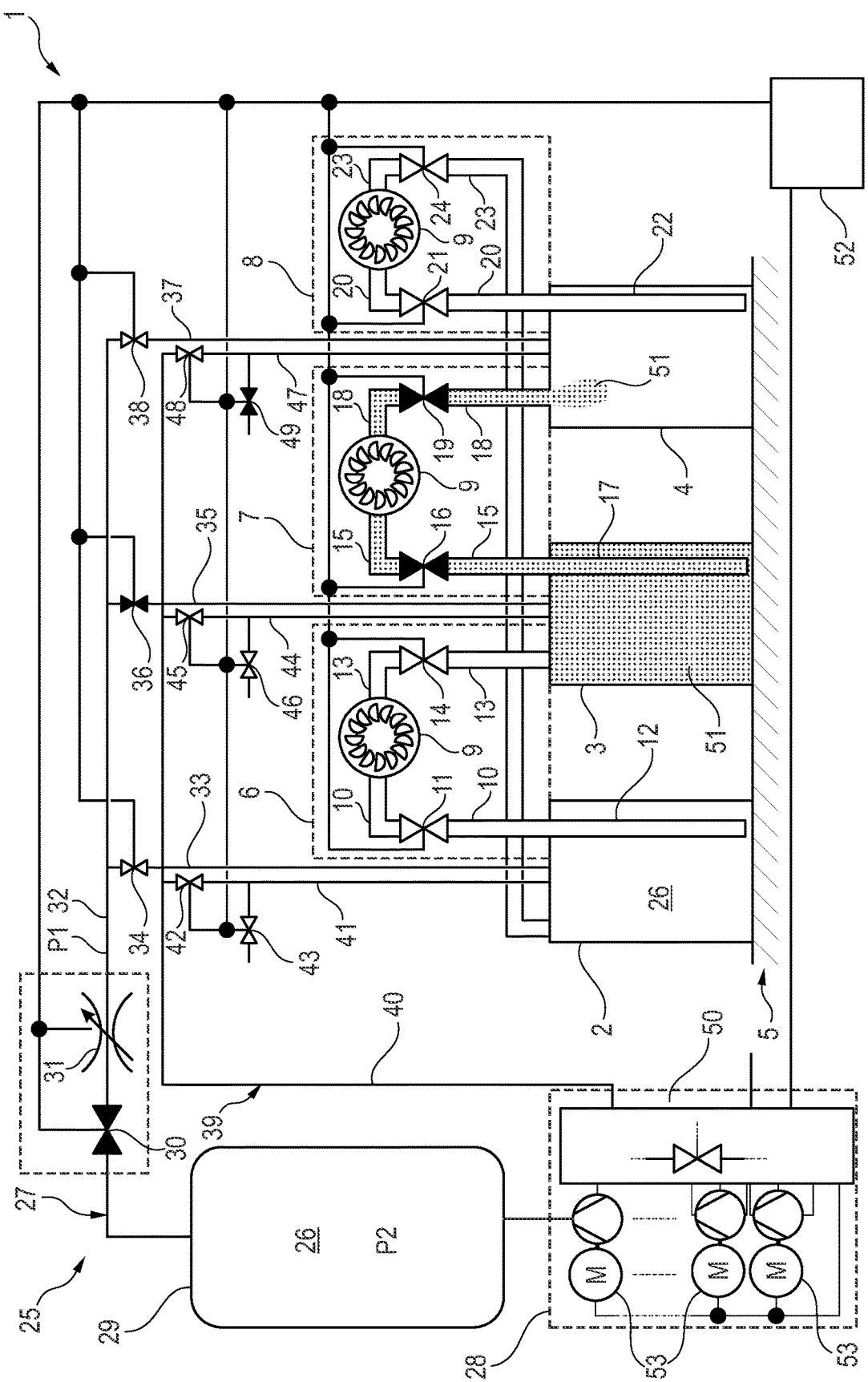
Figure 4:
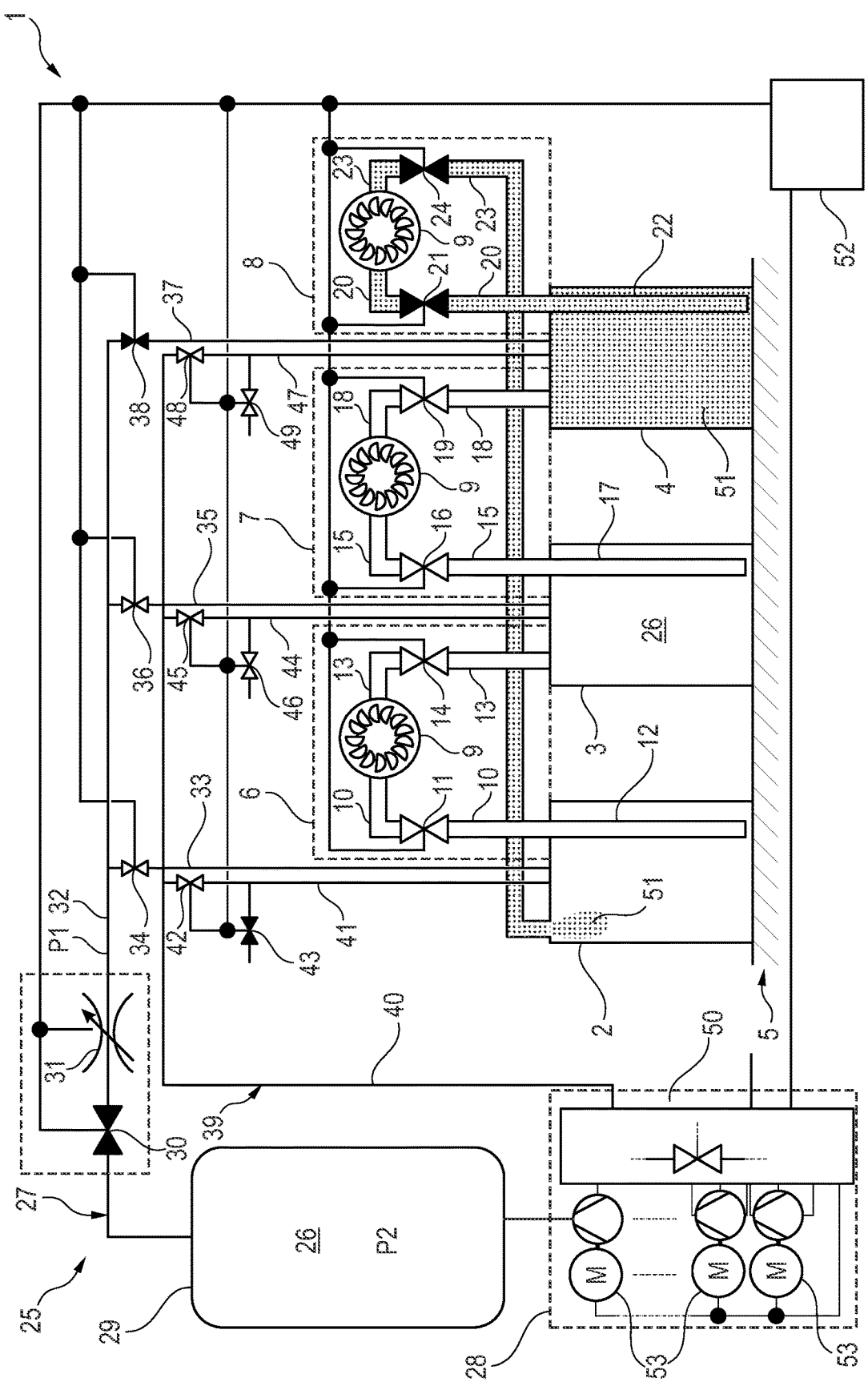

FIGS. 2 to 4 show schematic diagrams of the energy recovery process, with each FIG. 2, 3, 4 representing an energy supply cycle. Here, at the beginning, the first liquid container 2 is substantially completely filled with liquid 51, in this case water. The other two liquid containers 3 and 4 are substantially completely empty. In addition, the pressure accumulator 29 is filled with working gas 26, in this case air, which has a storage pressure P2 that is higher than the working pressure P1.

In FIG. 2, the shut-off valve 30, the first supply valve 34, the first turbine inlet valve 11, the first outlet valve 14 and the second vent valve 46 are open. The remaining valves are closed. The pressure regulator 31 keeps the working pressure P1 of the working gas 26 constant. The working gas 26 pushes on the liquid 51 in the first liquid container 2 with the working pressure P1. As a result, the liquid 51 is pushed through the first turbine inlet piping 10, through the first turbine inlet valve 11, through the Pelton turbine 9, through the first outlet piping 13, through the first outlet valve 14, i.e. through the first turbine unit 6, into the second liquid container 3. This drives the Pelton turbine 9 and the associated generator (not shown). The generator, optionally with the aid of electronics, feeds the recovered energy into the power grid (not shown). Because the second vent valve 46 is open, the liquid 51 flowing into the second liquid container 3 can displace the air out of the second liquid container 3 through the second vent valve 46. Thus, there is a substantially constant pressure in the second liquid container 3. Because the pressure in the first liquid container 2 also corresponds to the constant working pressure P1, a constant pressure difference is established between the two liquid containers 2 and 3. This causes the Pelton turbine 9 to operate at a constant speed (except for the run-in and run-out phases).

In FIG. 3, the shut-off valve 30, the second supply valve 36, the second turbine inlet valve 16, the second outlet valve 19 and the third vent valve 49 are open.

The remaining valves are closed. This means that the previously opened first supply valve 34, the first turbine inlet valve 11, the first outlet valve 14 and the second vent valve 46 are now closed. The pressure regulator 31 keeps the working pressure P1 of the working gas 26 constant. The working gas 26 pushes on the liquid in the second liquid container 3 with the working pressure P1. As a result, the liquid is pushed through the second turbine inlet piping 15, through the second turbine inlet valve 16, through the Pelton turbine 9, through the second outlet piping 18, through the second outlet valve 19, i.e. through the second turbine unit 7, into the third liquid container 4. This drives the Pelton turbine 9 and the associated generator. The generator feeds the recovered energy into the power grid. Because the third vent valve 49 is open, there is a substantially constant pressure in the third liquid container 4, analogously to the previously mentioned situation. Because the pressure in the second liquid container 3 also corresponds to the constant working pressure P1, a substantially constant pressure difference is again established between the two liquid containers 3 and 4. Thus, this Pelton turbine 9 is also operated at a constant speed (except for the run-in and run-out phases).

The first liquid container 2 still contains the working gas 26 at a pressure that corresponds approximately to the working pressure P1. The control unit 52 can now decide, based on internal and external information, whether it makes more sense to run a high pressure or a low pressure mode, as described below. What is considered more appropriate may vary depending on the preference of the operator. For example, regulation may depend on economic or ecological aspects. Also, the load on the individual system components may be taken into account, and a durability of these may be considered as a reasonable regulation. Optimal target values or a compromise of these target values may also be considered appropriate and aimed for in the regulation.

When the unit is ready for operation, the storage pressure P2 is always higher than or at least equal to the working pressure P1. The storage pressure P2 may be slightly higher than the working pressure P1 in order to be able to recirculate the working gas with as little energy demand as possible.

This low-pressure mode makes it possible to run through several energy supply cycles as efficiently as possible. For example, the working pressure P1 may be 100 bar and the storage pressure P2 may be 120 (to 150) bar. This may also be useful, for example, if large but less pressure-resistant pressure accumulators 29, such as natural underground accumulators, are used. In most cases, however, it is desirable to store as much energy as possible in as little space as possible.

Therefore, the pressure accumulator 29 may also be designed as a high-pressure accumulator for storage pressures P2 of, for example, 1000 bar. When the storage pressure P2 is relatively high, for example 1000 bar, and the working pressure P1 is much lower in comparison, for example 100 bar, the system 1 may be operated in a high-pressure mode such that the working gas 26, which at the end of the energy supply cycle is in that pressure vessel 2 which is to be refilled with liquid 51, is not returned to the working gas supply unit 25 but is vented through the vent valve 43. The advantages of these two systems or modes may also be combined. In this way, in case of an energy surplus, the working gas may be stored up to high storage pressures of, for example, 1000 bar. If energy is required, this may then be used as described for high pressures, in high-pressure mode, until recirculation of the working gas is more practical (for example, in terms of energy). The system may then be operated as described for low pressure differences, in low pressure mode. Therefore, as long as the storage pressure P2 is substantially higher than the working pressure P1, the valves are switched in such a way that the working gas 26 is released into the environment through the respective vent valves 43, 46, 49 at the end of the energy supply cycle. So, for example, the working gas 26 leaks out of the liquid container 2 after the liquid has been conveyed from it into the liquid container 3, through the vent valve 43. As soon as the storage pressure P2 has fallen below a certain threshold so that the pressure difference between storage pressure P2 and working pressure P1 is so small that energy recirculation is useful, the valves are switched so that the working gas 26 is conveyed through the respective recirculation lines 41, 44, 47 and the respective recirculation valves 42, 45, 48. So, for example, the working gas 26 from the liquid container 2, after the liquid 51 has been conveyed from it to the liquid container 3, is conveyed back to the working gas supply unit 25 through the recirculation line 41 and through the recirculation valve 42.

This regulation is performed by the control unit 52. For this purpose, the system is equipped with the necessary actuators to control the various valves, the motors 53 of the compressors 28, and the pressure regulator 31, as well as the corresponding usual sensors (which have not been shown in order not to further overload the figures). The control unit 52 is designed to use the various information from the sensors, as well as external factors such as energy demand or energy surplus, to decide which mode is the most appropriate and to control the actuators accordingly.

This means that in the case of the energy supply cycle shown in FIG. 3, where the liquid 51 is conveyed from the second liquid container 3 to the third liquid container 4, in the case of a high pressure mode, the working gas 26 leaks from the first liquid container 2 through the first vent valve 43. In the case of a low-pressure mode, the working gas 26 is fed through the first recirculation line 41 and through the first recirculation valve 42, through the central recirculation line 40 into the supply air selection unit 50. Here, the working gas 26 is compressed to the storage pressure P2 by the compressor stage(s) of the compressor 28 that are optimal for the respective pressure, and fed into the pressure accumulator 29.

In FIG. 4, the shut-off valve 30, the third supply valve 38, the third turbine inlet valve 21, the third outlet valve 24 and the first vent valve 43 are open. The remaining valves are closed. This means that the previously opened second supply valve 36, the second turbine inlet valve 16, the second outlet valve 19 and the third vent valve 49 are now closed. The pressure regulator 31 keeps the working pressure P1 of the working gas 26 constant. The working gas 26 pushes on the liquid 51 in the third liquid container 4 with the working pressure P1. As a result, the liquid 51 is pushed through the third turbine inlet piping 20, through the third turbine inlet valve 21, through the Pelton turbine 9, through the third outlet piping 23, through the third outlet valve 24, i.e. through the third turbine unit 8, into the first liquid container 2. This drives the Pelton turbine 9 and the associated generator. The generator feeds the recovered energy into the power grid. Because the first vent valve 43 is open, there is a constant pressure in the first liquid container 2. Because the pressure in the third liquid container 4 also corresponds to the constant working pressure P1, a constant pressure difference is established between the two liquid containers 4 and 2. Thus, the Pelton turbine 9 is operated at a constant speed (except for the run-in and run-out phases).

Depending on the storage pressure P2 with respect to the working pressure P1, as well as the other internal and external information, the control unit 52 now starts a high-pressure mode or a low-pressure mode for the second liquid container 3 filled with working gas 26. In the case of a high-pressure mode, the working gas 26 is vented from the second liquid container 3 through the second vent valve 46. In the case of a low-pressure mode, the working gas 26 is fed through the second recirculation line 44 and through the second recirculation valve 45, through the central recirculation line 40 into the supply air selection unit 50. Here, the working gas 26 is compressed to the storage pressure P2 by the compressor stage(s) of the compressor 28 that are optimal for the respective pressure, and fed into the pressure accumulator 29.

Now the energy supply cycle can start again as shown in FIG. 2. The energy recovery over the series of energy supply cycles can therefore run seamlessly, and in such a way that the intermediate filling of additional containers without energy recovery can be omitted.

Heat is generated when the working gas 26 is compressed in the compressor 28. To improve the efficiency of the system 1, the heat may be stored in heat accumulators. It may then be used at a later time, when there is a demand for energy and the working gas 26 is expanded by the pressure regulator 31 and thereby cooled, to heat the expanding working gas 26.

Alternatively, or in addition, a heat exchanger may be provided which is designed to remove the heat generated during compression from the compressor 28 and use it to evaporate water that drives a steam turbine. This kinetic energy may be used in various ways to increase the efficiency of the system 1.

The control unit 52 has its own emergency energy storage to supply itself and the actuators with energy in the event of a power failure. Furthermore, the valves may also be operated manually or with an appropriate tool. System 1 is therefore black start capable. In the event of a power failure, the system 1 can also start the energy recovery cycle without external intervention. For this purpose, the valves are switched in the same way as during normal start-up. The emergency energy storage is used to switch the valves. If it does not contain sufficient energy, the valves may also be switched manually accordingly. As soon as the first energy supply cycle has started, sufficient electrical energy is provided for the operation of the system 1, in order to switch autonomously to the other energy supply cycles.

However, the liquid containers 2, 3, 4 do not necessarily have to be arranged as shown in the figures. They may also be placed side by side to save space, or arranged in a way that is advantageous according to the landscape conditions. They may also have different shapes. They may be rectangular or cubic, but also spherical or cylindrical. It is also possible, for example, for a cylindrical container, for example, to be divided into several segments, for example into three segments, each segment acting as a liquid container as described here. This makes it possible to achieve an extremely short pipe routing and accordingly optimise or reduce the pipe resistance.

Even though a separate Pelton turbine 9 is shown for each turbine unit 6, 7, 8 in the figures, these three Pelton turbines 9 may also be merged into a single Pelton turbine 9. In this case, the single (central) Pelton turbine 9 is operated by means of the turbine units 6, 7, 8. The design of the system 1 may lead to shorter, if well-adapted hardly noticeable, run-up and run-down phases between the energy provision cycles.

The number of energy recovery cycles that the system 1 can provide without recharging the pressure accumulator 29 ultimately depends on the amount of gas stored in the pressure accumulator 29 at the storage pressure P2.

Finally, it should be noted once again that the figures described in detail above are only exemplary embodiments which can be modified by the skilled person in a wide variety of ways without leaving the scope of the invention. For the sake of completeness, it should also be noted that the use of the indefinite articles "a", "an" or "one" does not exclude the possibility that the elements concerned may also be present more than once.

The invention claimed is:

1. A system for storing and recovering energy, comprising:
   at least two liquid containers for storing a liquid, wherein the at least two liquid containers are at least one of located at substantially the same level and have a substantially identical volume, and
   a turbine unit for power generation, which connects liquid containers from the at least two liquid containers to one another and is driven when liquid from one liquid container of the at least two liquid containers is conducted through the turbine unit into the other liquid container of the at least two liquid containers, and
   working gas supply unit for providing a working gas having a constant working gas pressure, the working gas supply unit being connected to the at least two liquid containers and designed to convey the liquid from the one liquid container of the at least two liquid containers through the turbine unit into the other liquid container of the at least two liquid containers using the working gas;
   wherein the working gas supply unit has a compressor and a pressure accumulator connected thereto on the outlet side;
   wherein the compressor is provided for compressing the working gas and storing the working gas as a compressed gas in the pressure accumulator;
   wherein the working gas supply unit is configured to return and recycle the working gas contained in at least one of the at least liquid containers to be compressed for storage in the pressure accumulator under a storage gas pressure, which is higher than the working gas pressure;
   wherein the compressor comprises a multi-stage compressor and a supply air selector unit configured to select between compressing the recirculated working gas from the liquid container using at least one compressor stage optimized for compression of gas above ambient pressure and compressing an ambient air, using all compressor stages; and
   wherein the compressor includes couplings configured to selectively disengage compressor stages designed for pressures lower than currently required pressures based on energy demand.

2. The system according to claim 1, wherein each liquid container comprises a vent valve which, when the liquid container is filled with liquid, serves to vent the liquid container in its open state and which, in its closed state, prevents the working gas introduced by the working gas supply unit from leaking.

3. The system according to claim 2, having more than two liquid containers, wherein the system is configured in such a way that the liquid can be conveyed sequentially through all liquid containers from one liquid container to the next liquid container only between two liquid containers at a time.

4. The system according to claim 1, wherein the at least two liquid containers comprises at least three liquid containers, wherein liquid is conveyed sequentially through all liquid containers of the at least three liquid containers from one of the one liquid containers to the next of the liquid containers only between two liquid containers at a time.

5. The system according to claim 1, having more than two liquid containers, wherein the system is configured in such a way that the liquid can be conveyed sequentially through all liquid containers from one liquid container to the next liquid container only between two liquid containers at a time.

6. The system according to claim 1, wherein the working gas is air.

* * * * *